May 18, 1965    S. M. SHONE    3,184,249
COLLAPSIBLE BABY STROLLER
Filed April 1, 1963    3 Sheets-Sheet 1
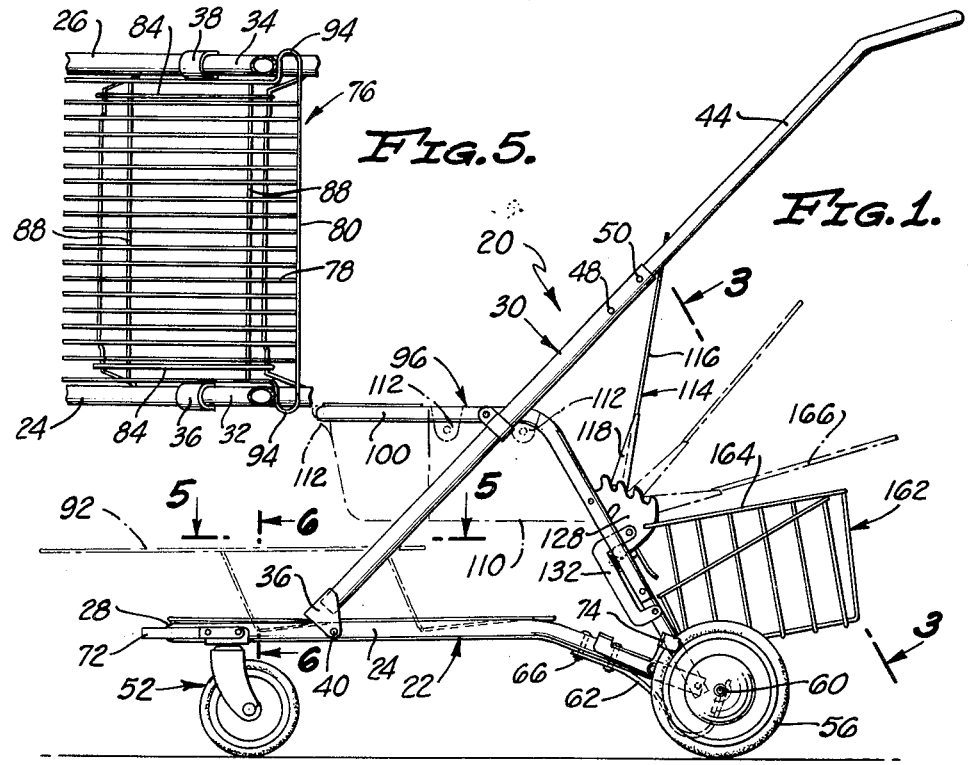
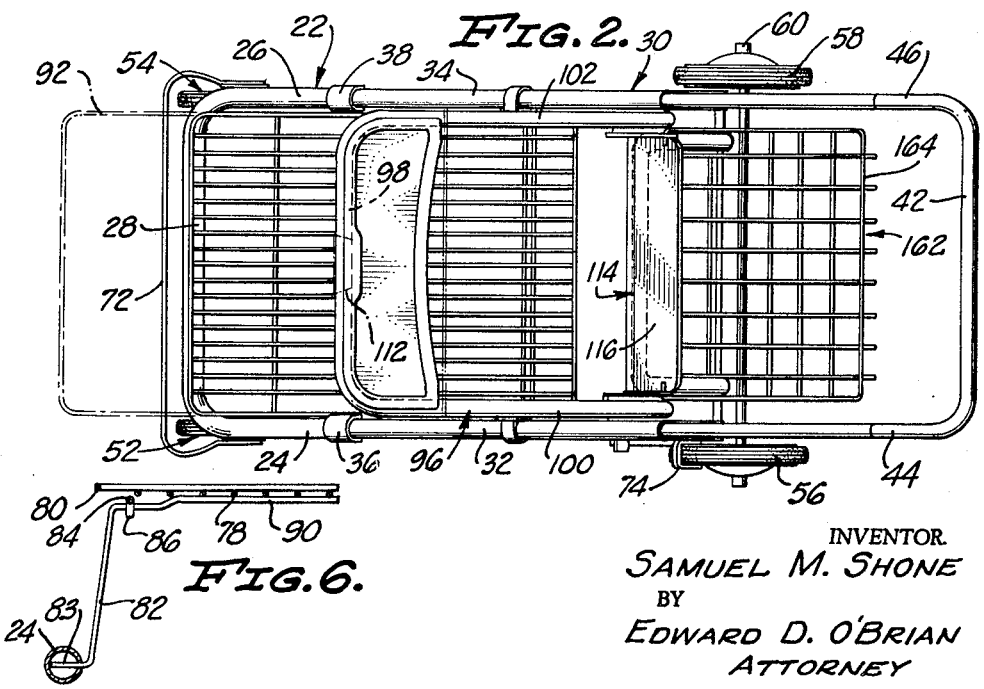
INVENTOR.
SAMUEL M. SHONE
BY
EDWARD D. O'BRIAN
ATTORNEY May 18, 1965  S. M. SHONE  3,184,249
COLLAPSIBLE BABY STROLLER
Filed April 1, 1963  3 Sheets-Sheet 2
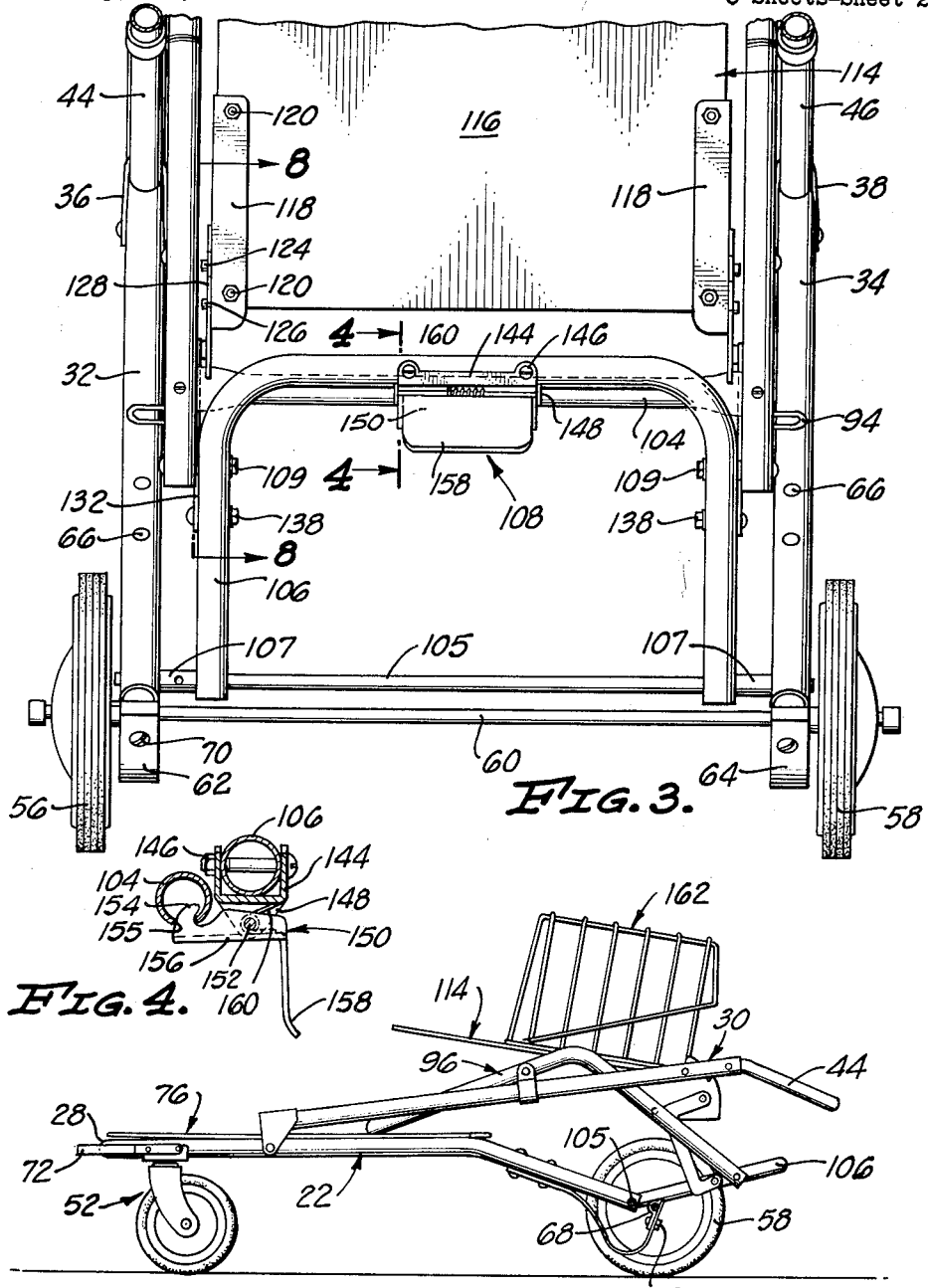
INVENTOR.
SAMUEL M. SHONE
BY
EDWARD D. O'BRIAN
ATTORNEY May 18, 1965
S. M. SHONE
3,184,249
COLLAPSIBLE BABY STROLLER
Filed April 1, 1963
3 Sheets-Sheet 3
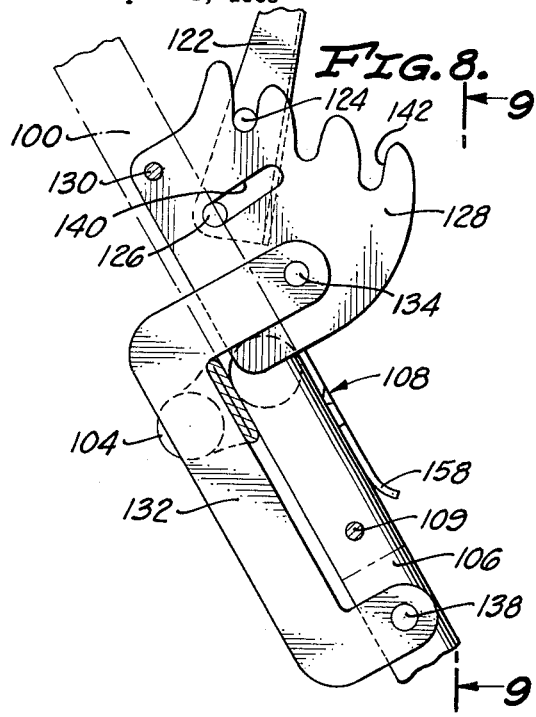
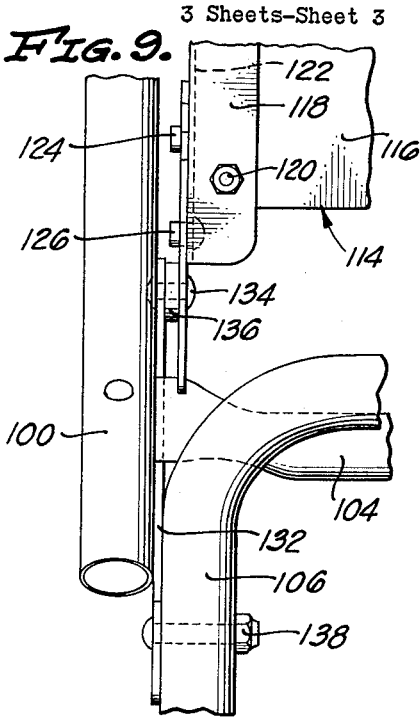
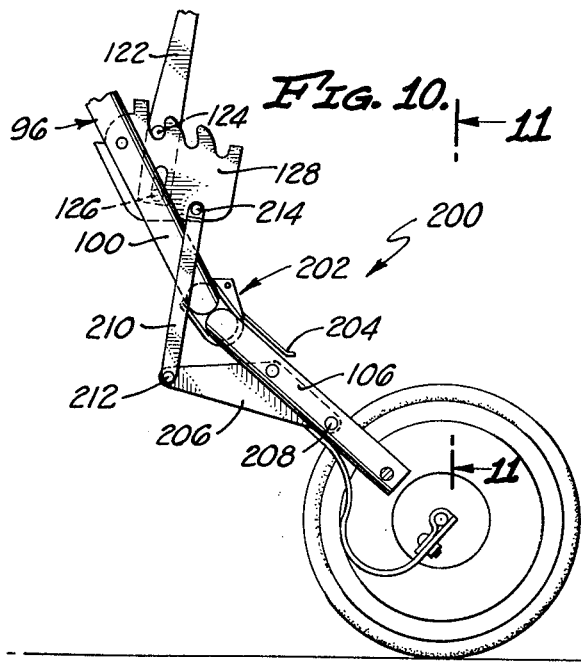
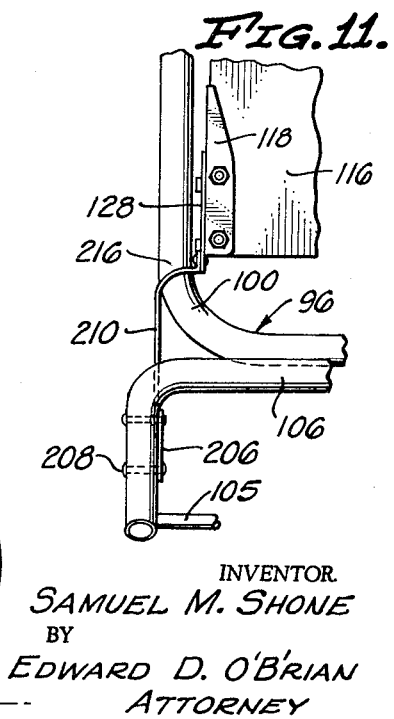
INVENTOR.
SAMUEL M. SHONE
BY
EDWARD D. O'BRIAN
ATTORNEY

United States Patent Office 3,184,249
Patented May 18, 1965

3,184,249
COLLAPSIBLE BABY STROLLER
Samuel M. Shone, Los Angeles, Calif., assignor to Babyline Furniture Corp., Los Angeles, Calif., a corporation of California
Filed Apr. 1, 1963, Ser. No. 269,630
9 Claims. (Cl. 280—36)

The present invention relates to a new and improved collapsible baby stroller construction.

In spite of the wide variety of baby stroller constructions presently available none of them provide the feature of easy one-handed operation to dispose them in their unfolded or erected position, or to collapse them to their folded position. Most types of collapsible strollers now available require the use of both hands and much strenuous manipulation to effect such erecting and collapsing operations. This requirement of the use of both hands imposes much inconvenience upon mothers, particularly when this type of stroller is used in conjunction with an automobile, because the mother must first provide for the comfort and safety of the baby before each of these operations is attempted. Accordingly, when it is desired to erect a stroller that is stored in an automobile the baby must be left on the seat of the car while the mother attends to erecting the stroller, then she must exert the extra effort of removing the child from the car and placing it in the stroller. On the other hand, when the mother arrives at the car with the baby in the stroller she must first secure the child in the seat of the car before dismantling the stroller for storage in the car. It is obvious that during both types of operation there is a period when the baby is not properly attended to. In addition to these drawbacks it is believed the reason most of the prior art strollers have not gained wide popularity may relate to their size and weight.

Accordingly, to be completely acceptable in the present market a baby stroller must be extremely light weight, must be capable of being folded to or from a small unit with only the requirement of one-handed manipulation, and must be capable of serving more than one function.

Therefore, it is an object of the present invention to provide a baby stroller of the class described meeting all of these qualifications.

A further object of the present invention is the provision of a light-weight collapsible baby stroller that can be easily folded and unfolded with the use of only one hand by the user.

Another object of this invention is to provide a baby stroller construction that is inexpensive of manufacture, which may be readily folded or opened by one-handed manipulation, is efficient in operation and capable of dependable operation over a long period of use.

The manner in which the advantages of the present invention are more particularly realized and its further objects and features achieved will become more clearly apparent from the subsequent detailed description of the invention taken in reference to the accompanying drawings in which:

FIG. 1 is an elevational view of one form of a collapsible baby stroller construction in accordance with the present invention;

FIG. 2 is a top view of the baby stroller shown in FIG. 1;

FIG. 3 is a fragmentary rear view taken along line 3—3 in FIG. 1;

FIG. 4 is a cross-sectional view taken along line 4—4 in FIG. 3;

FIG. 5 is a cross-sectional view taken along line 5—5 in FIG. 1;

FIG. 6 is a cross-sectional view taken along line 6—6 in FIG. 1;

FIG. 7 is an elevational view of the baby stroller shown in FIG. 1 in its folded condition;

FIG. 8 is an enlarged cross-sectional view taken along line 8—8 in FIG. 3;

FIG. 9 is a view of the structure of FIG. 8 taken along line 9—9 in FIG. 8;

FIG. 10 is a fragmentary elevational view of a modified structural feature of the device shown in FIG. 1; and FIG. 11 is a cross-sectional view taken along line 11—11 in FIG. 10.

The accompanying drawings are primarily intended so as to illustrate presently preferred means of constructing a collapsible baby stroller falling within the scope of this disclosure. It is to be understood that those skilled in the art to which this invention pertains may effect alterations in the embodiments of the collapsible baby strollers disclosed by use of ordinary engineering skills without departure from the inventive concepts of the devices of this invention. Also further equivalent means can be employed in order to accomplish the operations and structural advantages of this invention.

As an aid toward understanding this invention it can be stated in essentially summary form that it involves a collapsible baby stroller comprising a plurality of pivotally connected light-weight tubular members that are locked in an erected disposition by a releasable catch mechanism capable of simple operation by the downward pressure from a person's toe. Once so released the tubular members constituting the stroller framework are self-folding into a compact unit which due to its compactness and light-weight can be easily handled with one hand. The stroller is as effortlessly unfolded by placement of the toe of a person on the rear axle and the application of a one-handed lifting movement to the pushing handle of the stroller until the catch is secured by self-action to dispose the tubular members in their erected or unfolded condition. Since a person using the stroller in the described manner must only use one-hand only relatively gentle movements are required to operate the stroller. It is quite obvious that the other hand will be entirely free to safely and comfortably carry a baby during the entire operation involved in both folding and unfolding the stroller.

The invention can be more fully understood by referring to the accompanying drawings in which a first modification of a stroller 20 of this invention is shown in FIGS. 1-9. As can best be seen in FIGS. 1-3 this stroller comprises a U-shaped tubular base frame 22 formed by side members 24 and 26 and a connecting front member 28. The side members 24 and 26 are pivotally connected to a U-shaped handle assembly 30 formed by a pair of straight tubular members 32 and 34 which are provided with U-brackets 36 and 38 at their lower end which are pivotally connected by bolts, or other suitable means, 40 to the side members of the base frame 22. This handle assembly 30 further includes a U-shaped hand gripping member formed by a hand grip bar 42 and a pair of side members 44 and 46 which are telescopically received in the upper ends of the tubular members 32 and 34. The hand gripping member may be disposed in an extended position as shown in FIG. 1 or in a retracted position as shown in FIG. 2 by means of a conventional catch represented by the buttons 48 and 50 at the top ends of the tubular members 32 and 34.

The base frame 22 is supported adjacent its front end on a pair of conventional stroller swivel wheel assemblies 52 and 54 and adjacent its rear end on a pair of wheels 56 and 58 joined in the usual fashion by an axle 60 which is resiliently attached to the side members 32 and 34 by means of generally L-shaped leaf springs 62 and 64. These leaf springs are suitably attached to the side members 32 and 34 by means such as rivets 66 and to the axle 60 by clamps formed by the free ends of the leaf springs, clamping plates 68 and securing bolts 70. The base frame 22 further includes a forward bumper 72 and a brake mechanism 74 for the rear wheels 56 and 58 both being of the usual construction.

At its forward end the base frame 22 supports an adjustable platform 76 formed from a plurality of parallel wire members 78 and attached outer wire frame 80. This platform 76 is attached to the side members 24 and 26 by a pair of U-shaped resilient wire members 82 whose laterally extending ends 83 are received through passages in the side member 24 and 26 as shown in FIG. 6. The members 82 are joined to the platform 76 by a pair of linkage arms 84 pivotally connected to the members 82 by end loops 86 and their passage over a pair of cross wires 88 attached to wire members 78. By virtue of a raised central portion 90 on these members 82 they may be moved with a resilient over-center movement between the portions 90 and wires 78 between a lowered position as shown in solid lines in FIG. 1 and a raised position as shown by dashed lines 92. It is to be noted that the rear portion of the outer frame 80 is provided with outwardly extending loops 94 which serve as stops and abut the tubular members 32 and 34 when the platform is raised to limit its forward position and rest on the side members 24 and 26 when the platform is disposed in its lowered position.

The base frame 22 and handle assembly 30 are collapsibly connected by means of a generally U-shaped seat support frame 96 comprising a front member 98 and rearwardly and downwardly extending side members 100 and 102; a cross bar 104 attached at each end adjacent the lower ends of the members 100 and 102 which cooperates with another U-shaped member 106 by means of a separable clamping assembly 108. The member 106 is pivotally connected to the members 24 and 26 by means of the axle 105 and spacers 107 affixed thereto.

This seat support frame 96 supports a seat 110 conventionally formed from a suitable flexible material by means of releasable tabs 112 which are looped over the front and side members of the frame 96 in the fashion shown in phantom in FIG. 1.

An adjustable seat back rest 114 is also carried by the seat support frame 96 which comprises a back rest 116 which is provided at its lower end at each side with a bracket 118 secured to the back rest by means, such as, bolts 120. As shown most clearly in FIGS. 3, 8 and 9, these brackets include side flanges 122 each of which is provided with a pair of laterally extending fixed studs 124 and 126.

As shown in FIG. 8, these studs 124 and 126 adjustably support the back rest 116 with respect to a pair of support plates 128 pivotally secured to the members 100 and 102 of the seat support frame by pivot pins 130. These plates 128 are each pivotally attached to one end of a generally U-shaped linkage arm 132 by pivot means comprising a loose rivet 134 and spacing washer 136. The other end of the linkage arm 132 is similarly pivotally attached to the downwardly extending arms of the U-shaped member 106 by the nut and bolt assemblies 138. This arrangement permits the back rest 114 to be pivoted to the desired inclination by means of studs 126 being disposed in the slots 140 in plates 128 and the stud 124 selectably disposed in the notches 142. This change of inclination is effected by lifting the back rest to clear the studs 124 from the notches 142 which permits the studs to be relocated in different notches 142 to attain the desired inclination of the back rest.

As can be seen most clearly in FIGS. 3 and 4, the releasable clamping assembly 108 comprises an elongated channel member 144 which is secured to the U-shaped member 106 by means of nut and bolt assemblies 146. Each of the ends of the channel member 144 is provided with downwardly directed apertured flanges 148 which pivotally support a movable latching member 150 upon the shaft 152. This latching member is provided with a latch hook 154 at the free end of an arm 156 which cooperates with an opening 155 in member 104 and an actuating lever 158 integrally joined to the other end of the arm 156. The latching member 150 is biased in a clockwise direction as viewed in FIG. 5, by means of a spring 160 disposed on the shaft 152 and whose ends bear against the channel 144 and arm 156.

In addition to the above structure, the stroller 20 includes a wire carrying basket 162 which is pivotally supported by inwardly bent ends of the top frame member 164 which are received in suitable apertures in the support plates 128. This basket rests against the rear of the stroller when the stroller is in the unfolded condition shown in FIG. 1 and against the back of the back rest 114 when the stroller is disposed in its folded condition as shown in FIG. 7.

In using the stroller 20 the various elements described above are positioned as shown in FIG. 1. The stroller may be used with the platform 76 in the solid line position as a foot rest for a baby occupying the seat 110. In this case the back rest 116 can be positioned so that the positioning studs 124 are in either the first or second notches of plate 128 as viewed in FIG. 8. If, however, it is desired to dispose the baby in a reclining position, the platform would then be positioned in the dashed line position 92 and the back rest 116 in the dashed line position 166 as shown in FIG. 1. This will provide a relatively flat surface to be utilized as a bed.

When the person wheeling the stroller desires to fold the stroller 20 to the folded position shown in FIG. 7, the person would first remove the baby from the stroller and with the toe of their foot lift up on the basket 162 and elevate, with a slight pressure, the actuating lever 158. This will release the latch hook 154 from the opening 155 in the cross member 104, see FIG. 4, and permit the handle assembly 30 to move downward from its own weight. This action is assured because the pivot points 134 and 138 lie in an over-center position with respect to the pivot points 109 and 130. Either prior to the stroller assuming the folded position of FIG. 7 or while in this position the buttons 48 and 50 may be depressed to permit inward telescoping of the handle 44. The folded stroller may easily be handled and stored in a relatively small storage space such as between the front and rear seat of an automobile or in a car trunk.

When it is desired to erect the stroller from the folded to the unfolded condition, it is merely necessary for a person to place one foot on a rear wheel 56 or 58 or on the axle 60 and apply a one-handed lift to the handle 44 until the latch hook 154 snaps into the opening 155. Since the latch is bias to a clockwise position, as viewed in FIG. 4, the latch hook 154 will remain locked over the edge of the opening 155 until an opposing force is applied to the actuating lever 158.

A second embodiment of the collapsible baby stroller 200 of this invention is shown in FIGS. 10 and 11. In this embodiment the clamping assembly 202 is the same as the assembly 108 of the stroller shown in FIGS. 1–9 except that the actuating tab or lever 204 is directed further rearward than the corresponding actuating tab 158 of the assembly 108. The salient feature of this modification distinguishing it over the construction of the stroller 20 is the linkage between the seat support frame 96 and the rear U-shaped member 106. This linkage comprises fixed triangular brackets 206 attached by means such as rivets 208 to the legs of the U-shaped member 106 and connecting linkages 210 having pivotal connection by means of rivets 212 and 214 to the brackets 206 and the pivoted adjustment plate 128. The linkages 210 are each provided with an outwardly directed offsetting bend 216. This arrangement permits the rear wheels 56 and 58 to be suspended directly from the U-shaped member 106 in the same manner these wheels are attached to the frame 22 in the stroller 20.

By virtue of this arrangement the stroller 200 can be folded slightly more compactly than the stroller 20 because the rear wheels 56 and 58 retract upwardly along with the ends of the U-shaped member 106. Otherwise the construction and operation of the stroller 200 is the same as that of the stroller 20.

From the foregoing it is apparent that the present invention has provided new and improved types of collapsible baby stroller constructions which may be folded to a collapsed position and unfolded therefrom to an erected position with the requirement of only the use of one hand. This feature of one-handed operation further provides the users of the types of stroller disclosed above the convenience of being able to place the stroller into and out of storage while holding the child for which the stroller was intended for use.

It will be realized by those skilled in the art to which this invention pertains that by ordinary skills a variety of different appearing collapsible baby strollers may be designed and built utilizing the features of the invention as embodied in the above described examples of the invention. Accordingly, since the structures of this invention are susceptible to such modification the invention is to be considered as being limited only by the appended claims.

I claim:
1. A collapsible baby stroller which comprises:
a U-shaped base frame having spaced parallel side members;
a U-shaped handle assembly comprising a pair of spaced parallel side members having the free ends thereof pivotally connected to opposed intermediate points along the parallel side members of said base frame;
a U-shaped seat support frame comprising spaced parallel side members having the portions thereof adjacent the bight of said support frame disposed in spaced parallel relation to the parallel side members of said base frame and a second portion of the side members of the support frame extending downwardly toward the free ends of the parallel side members of said base frame, said support frame further including a connecting member disposed in parallel relation to said bight connecting the second portions of the side members of said support frame;
a rear U-shaped member comprising parallel leg members having the free ends thereof pivotally attached to the base frame adjacent the free ends of the parallel side members of said base frame; and
disengageable clamping means connecting the bight portion of said rear U-shaped member to said connecting member, said disengageable clamping means comprising an elongated channel secured to one of said members, an opening in the other of said members adjacent said elongated channel, an apertured flange positioned on said elongated channel, an arm pivotally supported upon said apertured flange and provided with a latch hook, said latch hook being positioned to be engageable within said opening, and an actuating lever on said arm and depending downwardly below said members so that upon actuation of said actuating lever said latch hook is removed from said opening so that said members are disengaged with respect to each other.

2. A collapsible baby stroller as defined in claim 1 wherein:
said lever arm comprises an intermediately pivoted lever arm having said latch hook disposed on one end thereof and an actuating portion disposed on the other end of said lever arm.

3. A collapsible baby stroller as defined in claim 2 wherein:
said handle assembly comprises a U-shaped handle having parallel side members telescopically received in tubular extension members and wherein said handle assembly is connected to said base member and said seat support by means of pivotal connection with said tubular extension members.

4. A collapsible baby stroller which comprises:
a U-shaped base frame having spaced parallel side members;
a U-shaped handle assembly comprising a pair of spaced parallel side members having the free ends thereof pivotally connected to opposed intermediate points along the parallel side members of said base frame;
a U-shaped seat support frame comprising spaced parallel side members having the portions thereof adjacent the bight of said support frame disposed in spaced parallel relation to the parallel side members of said base frame and a second portion of the side members of the support frame extending downwardly toward the free ends of the parallel side members of said base frame, said support frame further including a connecting member disposed in parallel relation to said bight connecting the second portions of the side members of said support frame;
a rear U-shaped member comprising parallel leg members having the free ends thereof pivotally attached to the base frame adjacent the free ends of the parallel side members of said base frame;
disengageable clamping means connecting the bight portion of said rear U-shaped member to said connecting member; and wherein
the pivotal connections between said seat support and said rear U-shaped member comprises a seat adjustment plate and a linkage arm pivotally connected to said seat adjustment plate and said rear U-shaped member.

5. A collapsible baby stroller as defined in claim 4 wherein:
said clamping means comprises a latch hook pivotally connected to the bight portion of said rear U-shaped member and a latch opening in said connecting member engageable by said latch hook.

6. A collapsible baby stroller as defined in claim 4 wherein
said clamping means comprises a lever arm pivotally connected to the bight portion of said rear U-shaped member, a latch hook disposed on said lever arm, and a latch opening in said connecting member releasably engageable by said latch hook.

7. A collapsible baby stroller as defined in claim 4 wherein:
said clamping means comprises a lever arm pivotally connected to the bight portion of said rear U-shaped member, a latch hook disposed on said lever arm, a latch opening in said connecting member releasably engageable by said latch hook and biasing means biasing said lever arm toward said connecting member.

8. A collapsible baby stroller as defined in claim 7 wherein
said lever arm comprises an intermediately pivoted lever arm having said latch hook disposed on one end thereof and an actuating portion disposed on the other end of said lever arm.

9. A collapsible baby stroller as defined in claim 8 wherein
said handle assembly comprises a U-shaped handle having parallel side members telescopically received in tubular extension members and wherein said handle assembly is connected to said base member and said seat support by means of pivotal connection with said tubular extension members.

References Cited by the Examiner
UNITED STATES PATENTS

| | | | |
|---|---|---|---|
| 1,956,261 | 4/34 | Wagner | 280—36 |
| 2,758,847 | 8/56 | Shone | 280—36 |
| 2,798,730 | 7/57 | Smith | 280—36 |
| 2,886,337 | 5/59 | Quisenberry | 280—36 |
| 3,075,783 | 1/63 | Flam | 280—36 |

ARTHUR L. LA POINT, *Primary Examiner.*